(12) United States Patent
Hunter

(10) Patent No.: US 11,125,344 B1
(45) Date of Patent: Sep. 21, 2021

(54) VALVE HAVING A SPOOL WITH FLUID JET SEPARATION FEATURES

(71) Applicant: Sun Hydraulics, LLC, Sarasota, FL (US)

(72) Inventor: Zachary Hunter, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 0 days.

(21) Appl. No.: 16/894,182

(22) Filed: Jun. 5, 2020

(51) Int. Cl.
*F16K 11/07* (2006.01)
*F16K 31/06* (2006.01)

(52) U.S. Cl.
CPC ...... *F16K 11/0716* (2013.01); *F16K 11/0708* (2013.01); *F16K 31/0613* (2013.01)

(58) Field of Classification Search
CPC .. F16K 11/07; F16K 11/0716; F16K 11/0708; F16K 31/0613; Y10T 137/8671; Y10T 137/86702; F15B 13/0402
See application file for complete search history.

(56) References Cited

U.S. PATENT DOCUMENTS

| | | | | |
|---|---|---|---|---|
| 3,633,606 A | * | 1/1972 | Hay | F16K 11/065 137/113 |
| 2008/0035225 A1 | * | 2/2008 | Tackes | F16K 11/0716 137/625.35 |
| 2015/0369092 A1 | * | 12/2015 | Parker | F16K 15/185 123/90.12 |
| 2016/0215894 A1 | * | 7/2016 | Girouard | F16K 11/105 |
| 2019/0128439 A1 | * | 5/2019 | Zahe | F16K 39/022 |

* cited by examiner

*Primary Examiner* — Kelsey E Cary
(74) *Attorney, Agent, or Firm* — McDonnell Boehnen Hulbert & Berghoff LLP

(57) ABSTRACT

An example valve includes a housing having a first port at a distal end of the housing and a second port at a side of the housing, wherein the housing is configured to receive fluid flowing laterally to the second port at the side of the housing and discharge fluid longitudinally through the first port; and a spool slidably accommodated within the housing, wherein a distal end of the spool is configured to control fluid flow from the second port to the first port, and wherein the distal end of the spool comprises: (i) a metering edge, (ii) a protrusion that protrudes longitudinally outward in a distal direction, and (iii) an undercut laterally interposed between the metering edge and the protrusion, wherein the undercut recedes longitudinally inward relative to the metering edge.

20 Claims, 5 Drawing Sheets

VALVE HAVING A SPOOL WITH FLUID JET SEPARATION FEATURES

BACKGROUND

A hydraulic valve directs the flow of a liquid medium, usually oil, through a hydraulic system. The direction of the oil flow is determined by the position of a spool or a poppet. The size of the valve may be determined by the maximum flow of the hydraulic system through the valve and the maximum system pressure.

An example valve may have a movable element inside a housing or sleeve. For instance, the valve may include a spool that is movable by an actuation mechanism (e.g., electric, hydraulic, pneumatic, or manual). Once the valve is actuated, the spool moves to allow fluid flow from a first port to a second port.

In example valves, fluid flow through the valve can cause Bernoulli flow forces to be applied to the spool. As a consequence, the valve might not operate as expected (e.g., the valve might not allow an expected amount of flow to go through the valve at a particular pressure). Flow forces may also cause the valve to require a larger actuation force to actuate the valve or a larger spring force to return the movable element to an unactuated position.

Therefore, it may be desirable to have a valve that reduces or mitigates the effects of the flow forces so as to reduce size and cost of the valve. It is with respect to these and other considerations that the disclosure made herein is presented.

SUMMARY

The present disclosure describes implementations that relate to a valve having a spool with fluid jet separation features.

In a first example implementation, the present disclosure describes a valve. The valve includes (i) a housing having a first port at a distal end of the housing and a second port at a side of the housing, wherein the housing is configured to receive fluid flowing laterally to the second port at the side of the housing and discharge fluid longitudinally through the first port; and (ii) a spool slidably accommodated within the housing, wherein a distal end of the spool is configured to control fluid flow from the second port to the first port, and wherein the distal end of the spool comprises: (a) a metering edge, (b) a protrusion that protrudes longitudinally outward in a distal direction, and (c) an undercut laterally interposed between the metering edge and the protrusion, wherein the undercut recedes longitudinally inward relative to the metering edge.

In a second example implementation, the present disclosure describes an assembly. The assembly includes a valve comprising: (i) a housing having a first port at a distal end of the housing and a second port at a side of the housing, wherein the housing comprises a first shoulder and threads formed on an exterior surface of the housing; and (ii) a spool slidably accommodated within the housing, wherein a distal end of the spool is configured to control fluid flow from the second port to the first port, and wherein the distal end of the spool comprises: (a) a metering edge, (b) a protrusion that protrudes longitudinally outward in a distal direction, and (c) an undercut laterally interposed between the metering edge and the protrusion, wherein the undercut recedes longitudinally inward relative to the metering edge. The assembly also includes a manifold having a cavity in which the valve is disposed. The manifold comprises: (i) a first manifold port fluidly coupled to the first port of the valve via a first fluid passage, wherein the first manifold port is configured to be fluidly coupled to a fluid reservoir, (ii) a second manifold port fluidly coupled to the second port of the valve via a second fluid passage, wherein the second manifold port is configured to be fluidly coupled to a source of fluid, and (iii) a second shoulder formed by an interior surface of the manifold, and (iv) respective threads formed on the interior surface of the manifold, wherein the threads of the valve threadedly engage the respective threads of the manifold, wherein the first shoulder of the housing mates with the second shoulder of the manifold, and wherein the assembly is configured such that fluid is received at the second manifold port and is provided laterally to the second port of the valve via the second fluid passage, and fluid is discharged longitudinally through the first port of the housing through the first fluid passage and the first manifold port.

In a third example implementation, the present disclosure describes a hydraulic system. The hydraulic system includes a source of fluid; a fluid reservoir; and a valve. The valve includes a housing having (i) a first port at a distal end of the housing and fluidly coupled to the fluid reservoir, and (ii) a second port at a side of the housing and fluidly coupled to the source of fluid, such that fluid flows laterally from the source of fluid to the second port at the side of the housing and fluid is discharged longitudinally through the first port at the distal end of the housing. The valve further includes a spool slidably accommodated within the housing, wherein a distal end of the spool is configured to control fluid flow from the second port to the first port, and wherein the distal end of the spool comprises: (i) a metering edge, (ii) a protrusion that protrudes longitudinally outward in a distal direction, and (iii) an undercut laterally interposed between the metering edge and the protrusion, wherein the undercut recedes longitudinally inward relative to the metering edge.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

An example valve can have an actuation mechanism such as a solenoid actuator, and when a solenoid coil of the solenoid actuator is energized, a solenoid force is generated and applied to a spool. In response, the spool can move, thereby varying a size of an orifice to throttle fluid flow through the valve.

The valve can further have a spring that applies a biasing force on the spool. When the valve is unactuated (e.g., a solenoid coil is de-energized), the spring pushes the spool back to an unactuated position. However, as fluid flows through the orifice, Bernoulli flow force can result from accelerating fluid mass therethrough. The flow force can have an axial component that acts on the spool against the force of the spring. As such, when the valve is unactuated, the spool might not return or shift all the way to an unactuated position, and the valve might not perform as expected, e.g., the amount of fluid flow through the valve may be smaller than expected at a particular pressure level. Similarly, when the valve is actuated from an unactuated position, the spool might not shift all the way to an actuated position, and the valve might not perform as expected.

One way to overcome the flow forces is to use a stronger spring. However, using a stronger spring may increase the size of the valve, and can also increase the required actuation force of the solenoid, thereby increasing the cost of the valve. It may thus be desirable to configure the valve in a manner that mitigates or reduces the flow forces so as to obtain the expected performance from the valve without using a stronger spring or solenoid force.

In the description below, a two-position, three-way valve is used to an example to illustrate features of the disclosure. However, it should be understood that the features disclosed herein can be used with a two-way, two-position valve or another valve configuration where fluid flows from a port at a side of a spool to a port at its end or nose.

Figure 1:
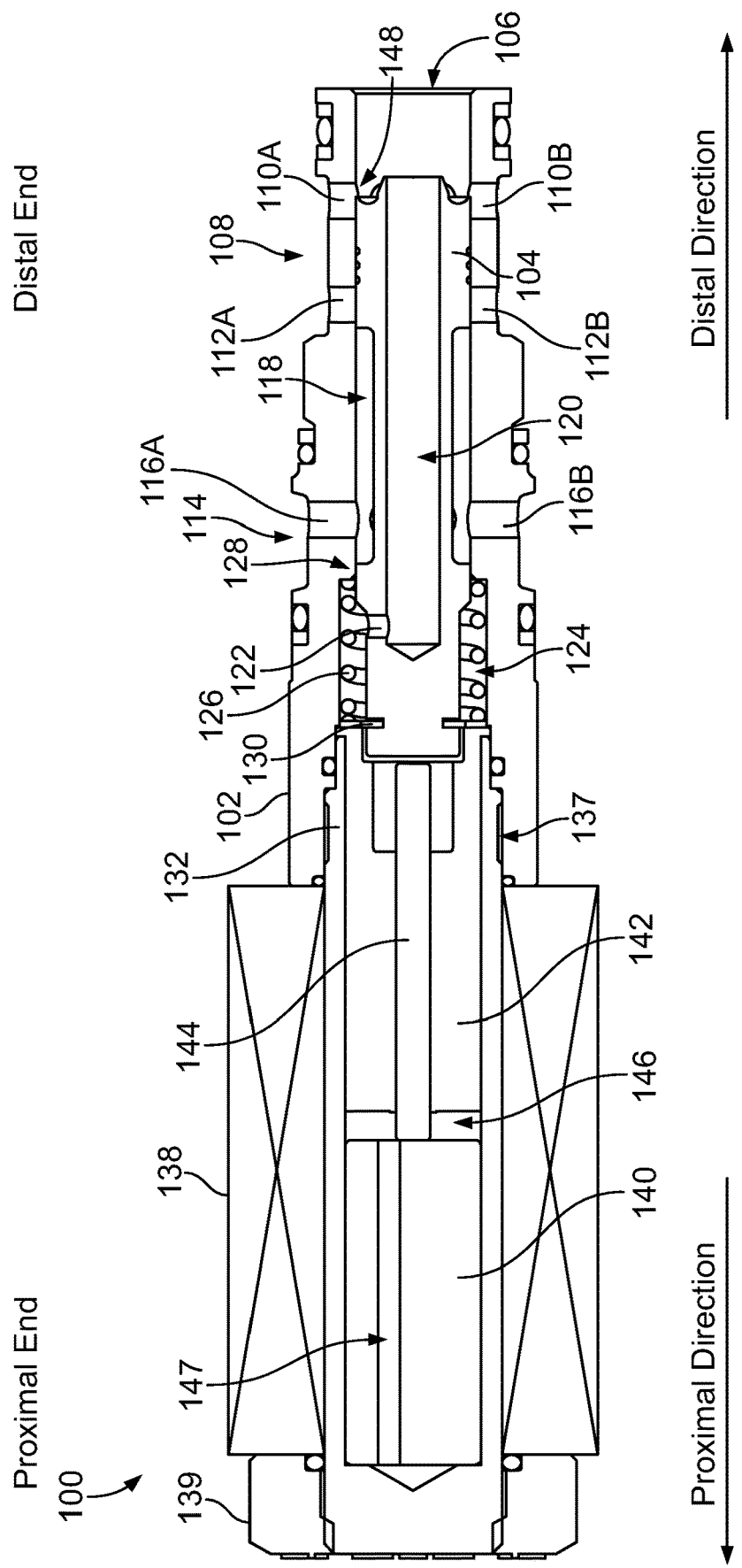
FIG. 1 illustrates a cross-sectional side view of a valve, in accordance with an example implementation.
Figure 2:
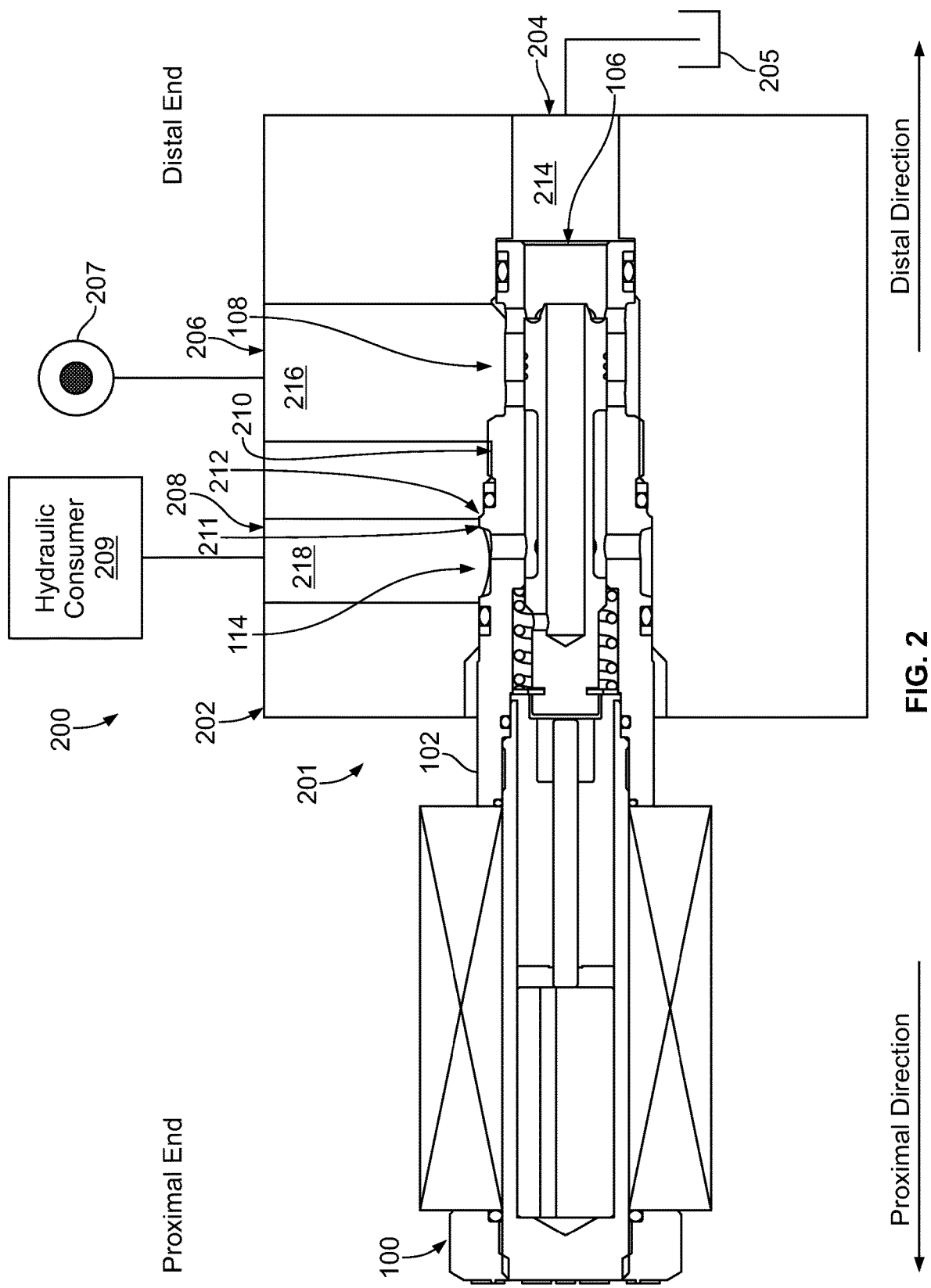
FIG. 2 illustrates a hydraulic system comprising an assembly of the valve of FIG. 1 inserted in a manifold, in accordance with an example implementation.

FIG. 1 illustrates a cross-sectional side view of a valve 100, and FIG. 2 illustrates a hydraulic system 200 comprising an assembly 201 of the valve 100 inserted in a manifold 202, in accordance with an example implementation. The manifold 202 can have a first manifold port 204 disposed on a side of the manifold 202 and configured as an outlet port that can, for example, be fluidly coupled to a fluid reservoir 205, e.g., a tank having fluid at a low pressure of about 0-70 pounds per square inch (psi).

The manifold 202 can also have a second manifold port 206 that can be fluidly coupled to a source 207 of fluid (e.g., a pump) and can be configured as an inlet port. The source can provide fluid at high pressure levels, e.g., pressure levels in the range of 1000-5000 psi. The manifold 202 can further include a third manifold port 208 configured as another outlet port or control port that can, for example, be fluidly coupled to a hydraulic consumer 209. The hydraulic consumer 209 can, for example, include a hydraulic circuit comprising multiple components. In an example, the hydraulic consumer 209 can be an actuator, such as a hydraulic cylinder or hydraulic motor.

The valve 100 can be screwed into the manifold 202, for example. For instance, a housing 102 of the valve 100 can have exterior threads that engage with interior threads of the manifold 202 at threaded region 210. Once screwed in the manifold 202, a flange or shoulder 211 of the housing 102 mates with and can rest against a shoulder 212 formed in the manifold 202. Several seals can be disposed between exterior surfaces of the valve 100 and interior surfaces of the manifold 202 to preclude fluid leakage between the ports. The valve 100 has ports that correspond to the ports of the manifold and configured to be fluidly coupled thereto.

Referring to FIG. 1, the valve 100 includes the housing 102 having a longitudinal cylindrical cavity therein. The valve 100 also includes a spool 104 disposed within the longitudinal cylindrical cavity of the housing 102. The spool 104 can also be referred to as a piston. The spool 104 is slidably accommodated within the housing 102 and is axially-movable therein. The term "slidably accommodated" is used throughout herein to indicate that a first component (e.g., the spool 104) is positioned relative to a second component (e.g., the housing 102) with sufficient clearance therebetween, enabling movement of the first component relative to the second component in the proximal and distal directions. As such, the first component (e.g., the spool 104) is not stationary, locked, or fixedly disposed in the valve 100, but rather, is allowed to move relative to the second component (e.g., the housing 102).

The valve 100 includes a first port 106 at a nose or distal end of the housing 102. The first port 106 can be referred to as an end port and is configured to be fluidly coupled to the first manifold port 204 via a first fluid passage 214 shown in FIG. 2. In an example, the first port 106 can be configured as an outlet port that can be fluidly coupled to the fluid reservoir 205 as mentioned above. In another example, the first port 106 is fluidly coupled to any other type of hydraulic consumer (e.g., another valve, another actuator, an accumulator, etc.).

The valve 100 also includes a second port 108 at a side of the housing 102 configured to be fluidly coupled to the second manifold port 206 via a second fluid passage 216 shown in FIG. 2. The second port 108 can thus be referred to as a side port.

As mentioned above, the second manifold port 206 can be configured to be coupled to the source 207 of fluid, such as a pump. As such, the second port 108 operates as an inlet port for the valve 100. With this configuration, as mentioned below, when the valve 100 is unactuated, inlet fluid flow can be received laterally at a side of the housing 102 at the second port 108 and discharged longitudinally through the first port 106.

The second port 108 can include a first set of cross-holes, such as cross-holes 110A, 110B, disposed in radial or circumferential array about the housing 102. The term "hole" is used generally herein to indicate a hollow place (e.g., cavity) in a solid body or surface, for example. The term "cross-hole" indicates a hole that crosses a path of, or is formed transverse relative to, another hole, cavity, or channel. The second port 108 can also include a second set of cross-holes, such as cross-holes 112A, 112B, disposed in radial or circumferential array about the housing 102. The second set of cross-holes is axially-spaced from the first set of cross-holes along a length of the housing 102.

In the example implementation of FIGS. 1-2, the valve 100 further includes a third port 114. As shown in FIG. 2, the third port 114 is configured to be fluidly coupled to the third manifold port 208 via a third fluid passage 218 shown in FIG. 2. In an example, the third port 114 can be configured as another outlet port or a control port that is fluidly coupled to the hydraulic consumer 209 of the hydraulic system 200 disposed downstream from the valve 100. In another example, the third port 114 can be configured as an inlet port, while the second port 108 can be configured as a control port fluidly coupled to a hydraulic consumer. The third port 114 can include a set of cross-holes, such as cross-holes 116A, 116B, disposed in radial or circumferential array about the housing 102.

In the first axial position (i.e., unactuated state or unactuated axial position) of the spool 104 shown in FIG. 1, the second port 108, and particularly the cross-holes 110A, 110B, is fluidly coupled to the first port 106. The spool 104, however, blocks the second set of cross-holes of the second port 108, e.g., the cross-holes 112A, 112B.

The spool 104 further comprises an annular groove 118 formed by an exterior surface of the spool 104. The annular groove 118 can be configured to fluidly couple the cross-holes 112A, 112B of the second port 108 to the cross-holes 116A, 116B of the third port 114 based on the axial position of the spool 104. In the unactuated spool position of the spool 104 shown in FIG. 1, the annular groove 118 does not receive fluid from the second port 108 via the cross-holes 112A, 112B, i.e., the cross-holes 112A, 112B of the second port 108 are fluidly decoupled from the cross-holes 116A, 116B of the third port 114. When actuated, as described below, the spool 104 can move in a distal direction, and the distal edge of the annular groove 118 can move past proximal edges of the cross-holes 112A, 112B, thereby fluidly coupling the second port 108 to the third port 114.

The term "fluidly coupled" is used herein to indicate that fluid can flow or be communicated between two fluid passages, chambers, ports, or openings. The term "fluidly decoupled" is used herein to mean that no substantial fluid flow (e.g., except for minimal leakage flow that can range from drops per minute to 300 milliliter per minute in some cases) occurs between two fluid passages, chambers, ports, or openings. Similarly, the term "block" is used throughout herein to indicate substantially preventing fluid flow except for minimal or leakage flow, for example.

As depicted in FIG. 1, the spool 104 can be partially hollow and includes a fluid channel 120 therein. A distal end of the fluid channel 120 is fluidly coupled to the first port 106, and thus the fluid channel 120 is configured to receive fluid from fluid flowing to the first port 106.

The spool 104 also includes a spool cross-hole 122 that fluidly couple the fluid channel 120 to a chamber 124 formed between an exterior surface of the spool 104 and an interior surface of the housing 102. With this configuration, the chamber 124 can have fluid having the same pressure level at the distal end of the spool 104. The fluid is thus communicated to a back end of the spool 104 and can apply a fluid force on the spool 104 in the distal direction.

The valve 100 further includes a spring 126 disposed in the chamber 124 about the exterior surface of the spool 104. The spring 126 has a distal end fixedly secured against a shoulder 128 formed by the interior surface of the housing 102. The proximal end of the spring 126 rests against a ring 130 fixedly disposed in an annular groove formed by the exterior surface of the spool 104. With this configuration, the spring 126 applies a biasing force on the spool 104 in the proximal direction.

In an example, the valve 100 is configured to be actuated via a push-type solenoid actuator. The push-type solenoid actuator includes a solenoid tube 132 disposed within, and received at, a proximal end of the housing 102. For example, the solenoid tube 132 can be threaded to the housing 102 at threaded region 137.

The solenoid actuator further includes a solenoid coil 138 disposed about an exterior surface of the solenoid tube 132 between a nut 139 and the proximal end face of the housing 102. The solenoid tube 132 is configured to house a plunger or armature 140.

The solenoid tube 132 further houses a pole piece 142 coaxial with the armature 140 and fixedly disposed within the solenoid tube 132. For example, the pole piece 142 can have a flanged distal end that is interposed between a distal end of the solenoid tube 132 and a shoulder formed by the interior surface of the housing 102. This way, the pole piece 142 is secured in-place.

The pole piece 142 further defines a longitudinal channel therein, and a push pin 144 is disposed in the longitudinal channel of the pole piece 142 between the proximal end of the spool 104 and the armature 140. Further, the pole piece 142 is separated from the armature 140 by an airgap 146 traversed by the push pin 144. The pole piece 142 can be composed of a material of high magnetic permeability.

Fluid from the first port 106 is communicated through the fluid channel 120, the spool cross-hole 122, the chamber 124, and unsealed spaces in the valve 100 to within the solenoid tube 132. Fluid is further communicated through longitudinal channel of the pole piece 142 in which the push pin 144 is disposed and the airgap 146, then through an armature channel 147 to a back end of the armature 140. This way, fluid having low pressure fills the solenoid tube 132, and thus the armature 140, as well as the push pin 144, is pressure-balanced.

The valve 100 can operate in an unactuated state in which the solenoid coil 138 is de-energized. In this state, fluid received at the second port 108 flows through the cross-holes 110A, 110B, through a flow area 148 formed between a metering edge at a distal end of the spool 104 and distal edges of the cross-holes 110A, 110B, then to the first port 106. The flow area 148 operates as a variable metering orifice the size of which can change based on the axial position of the spool 104. In this state, the cross-holes 112A, 112B are blocked and fluid does not flow from the second port 108 to the third port 114.

The valve 100 can also operate in an actuated state in which the solenoid coil 138 is energized by electric power, e.g., an electric current. When an electric current is provided through the windings of the solenoid coil 138, a magnetic field is generated. The pole piece 142 directs the magnetic field through the airgap 146 toward the armature 140, which is movable and is attracted toward the pole piece 142. In other words, when an electric current is applied to the solenoid coil 138, the generated magnetic field forms a north and south pole in the pole piece 142 and the armature 140, and therefore the pole piece 142 and the armature 140 are attracted to each other. Because the pole piece 142 is fixed while the armature 140 is movable, the armature 140 is attracted and is movable across the airgap 146 toward the pole piece 142. Thus, when the electric current or voltage is provided to the solenoid coil 138, a solenoid force is generated and is applied to the armature 140, thereby attracting the armature 140 toward the pole piece 142.

As the armature 140 is attracted toward the pole piece 142, the armature 140 applies the solenoid force on the push pin 144. The armature 140 thus pushes the push pin 144 in the distal direction (e.g., to the right in FIG. 1), causing the push pin 144 to move axially in the distal direction, thereby contacting the proximal end of the spool 104.

When the solenoid force overcomes the biasing force of the spring 126 and friction forces, the push pin 144 can cause the spool 104 to also move axially in the distal direction. The axial distance that the armature 140, the push pin 144, and the spool 104 move can be based on a magnitude of electric signal (e.g., electric current) provided to the solenoid coil 138 (i.e., based on a magnitude of the solenoid force generated by the electric signal).

As the spool 104 moves in the distal direction, the spring 126 is compressed and its biasing force increases. The spool 104 can move in the distal direction to a particular axial position at which force equilibrium between forces acting on the spool 104 is achieved. Based on the magnitude of the solenoid force, the spool 104 can move a sufficient axial distance to a second axial position at which the spool 104 blocks the cross-holes 110A, 110B and the distal edge of the annular groove 118 moves past the proximal edge of the cross-holes 112A, 112B. At such axial position, the annular groove 118 fluidly couples the second port 108 to the third port 114, and fluid flows through the cross-holes 112A, 112B, the annular groove 118, and the cross-holes 116A, 116B to the third port 114.

When the solenoid coil 138 is de-energized (e.g., command signal to the solenoid coil 138 is reduced or removed), the armature 140 is no longer attracted by a magnetic force toward the pole piece 142, and the spring 126 pushes the spool 104 in the proximal direction. As the spool 104 moves in the proximal direction to return to an unactuated axial position, the cross-holes 112A, 112B can be blocked again, while the cross-holes 110A, 110B can become unblocked by the spool 104. Thus, the flow area 148 opens again and fluid can then flow from the second port 108 to the first port 106.

As fluid flows through the flow area 148, fluid forces that oppose the biasing force of the spring 126 and movement of the spool 104 in the proximal direction can be generated. For example, Bernoulli flow force can result from accelerating fluid mass through the flow area 148. The flow force can have an axial or longitudinal component that acts on the spool 104 in the distal direction, opposing the biasing force of the spring 126. The magnitude of such flow force can be based on pressure drop across the flow area 148, i.e., the difference between pressure level at the second port 108 and the pressure level at the first port 106. The magnitude of the flow force can also be based on an angle of the fluid jet as fluid enters the flow area 148. Such angle can be affected by a shape of the distal end of the spool 104 that interacts with the fluid.

Further, a pressure profile of fluid disposed at the distal end face of the spool 104 can affect fluid forces acting on the spool 104. The pressure profile and the associated fluid force are based on the shape of the distal end face of the spool 104.

Also, as the jet of fluid impinges on the side of the distal end of the spool 104 a stagnation pressure may form at a distal end of the spool 104, which is then communicated to the chamber 124. Such stagnation pressure may be locally higher than pressure level at the first port 106 and it applies a force on the spool 104 in the distal direction opposing the spring 126.

As such, fluid forces act on the spool 104 in the distal direction opposing the biasing force of the spring 126. As a result, the spool 104 might not return all the way back to its unactuated axial position, and the size of the flow area 148 may be smaller compared to when the spool 104 is shifted fully to its unactuated axial position. The valve 100 might thus not perform as expected and a reduced amount of fluid flow rate may pass therethrough.

Particularly, assuming pressure level at the second port 108 is $P_2$ and the pressure level at the first port 106 is $P_1$, then using the Bernoulli orifice equation, the fluid flow rate Q through the flow area 148 can be determined as:

$$Q = K\sqrt{(P_2 - P_1)} \tag{1}$$

where K is a variable that is proportional to the size of the flow area 148. For given pressure levels, a smaller flow area leads to a smaller K value and less fluid flow rate Q through the valve 100. For example, if the pressure drop is about 3000 psi, the expected fluid flow that can be achieved if the spool 104 returns all the way to its unactuated position can amount to about 14 gallons per minute (gpm). However, due to the fluid forces causing the spool 104 to be held at a middle position between an actuated position and an unactuated position, the fluid flow rate can be about 6.5 gpm, less than half the expected amount. Alternatively, to achieve an expected fluid flow rate, a higher $P_2$ pressure level, e.g., 5000 psi at the second port 108 might be required, rendering the hydraulic system 200 less efficient.

Making the spring 126 stronger, e.g., by increasing the spring constant, to overcome the fluid forces may result in using a large solenoid coil that can generate a large solenoid force to overcome the biasing force of the spring 126 when the valve 100 is actuated. Increasing the spring rate of the spring 126 can increase the size of the valve 100, and using a larger solenoid coil can lead to an increase in cost and bulkiness. It may thus be desirable to reduce or mitigate the effects of the fluid forces generated as the fluid flow through the flow area 148 without using a stronger spring or a more expensive solenoid coil. The configuration of the spool 104 described herein may mitigate the fluid forces.

Figure 3:
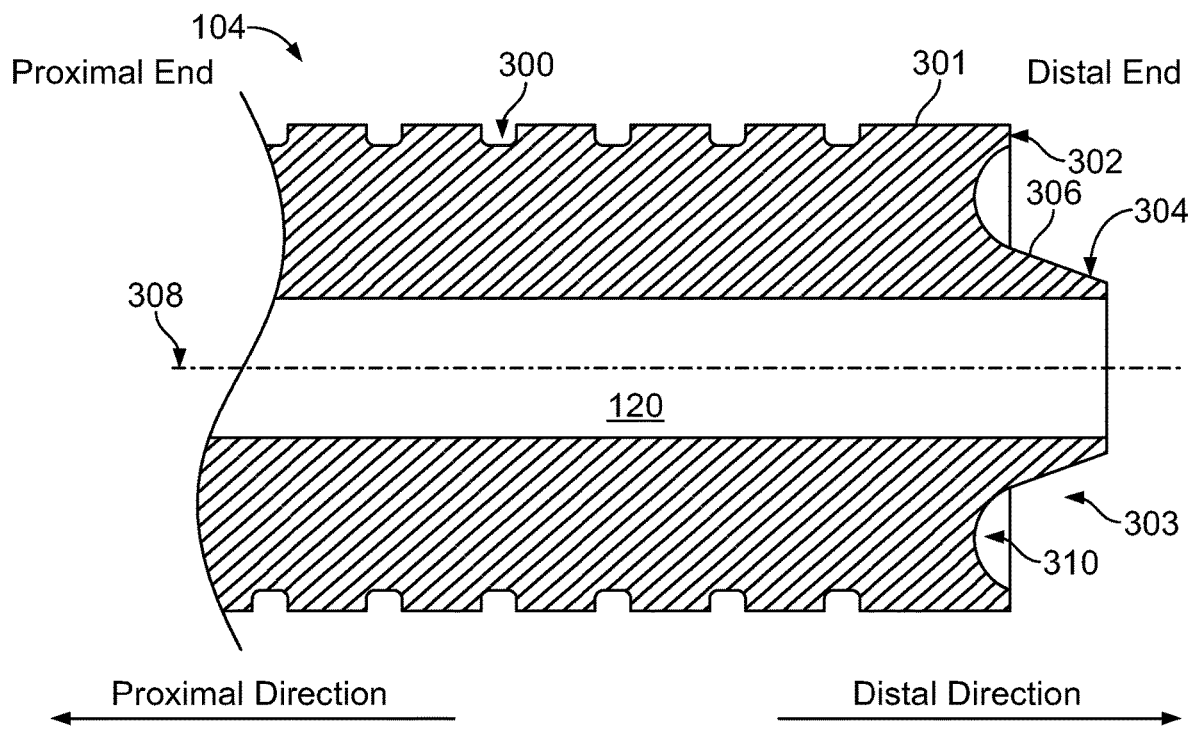
FIG. 3 illustrates a partial cross-sectional side view of a spool, in accordance with an example implementation.
Figure 4:
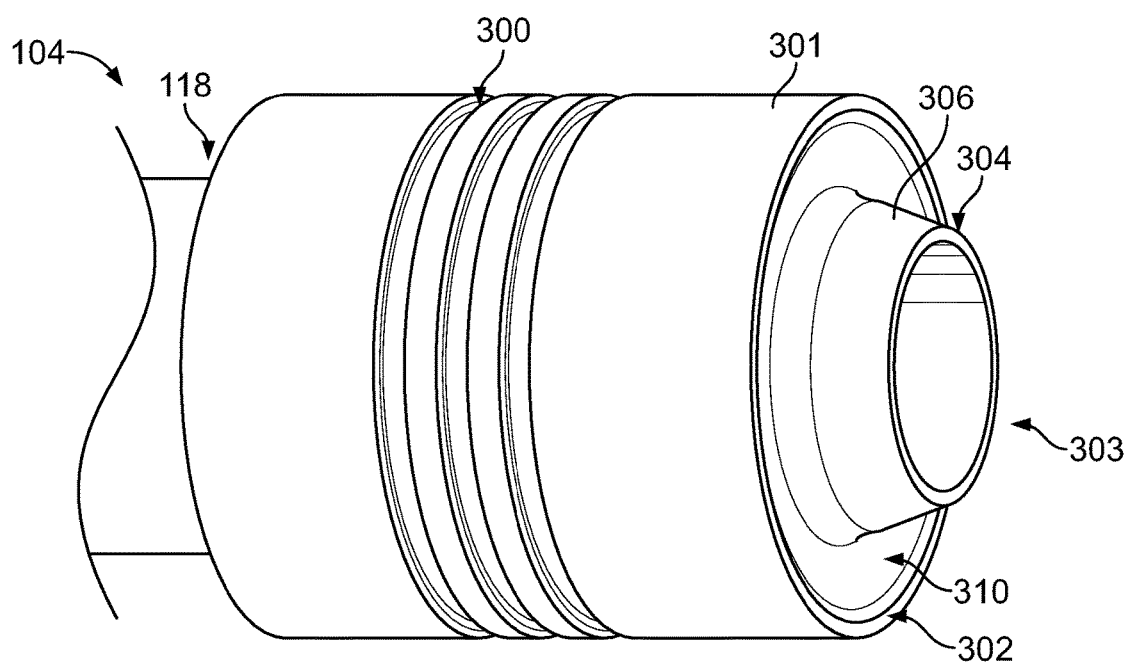
FIG. 4 illustrates a partial perspective view of the spool of FIG. 3, in accordance with an example implementation.

FIG. 3 illustrates a partial cross-sectional side view of the spool 104, and FIG. 4 illustrates a partial perspective view of the spool 104, in accordance with an example illustration. Particularly, FIGS. 3-4 illustrates a zoom-in view of a distal portion of the spool 104. FIGS. 3-4 are described together.

As shown in FIG. 3, the spool 104 can have a plurality of lubrication annular grooves such as annular groove 300 formed by an exterior peripheral surface 301 of the spool 104. The lubrication annular grooves can be filled with fluid during operation of the valve 100 to facilitate axial movement of the spool 104 within the housing 102 and preclude the spool 104 from binding. Further, a distal end face 303 of the spool 104 can be configured with features that reduce or mitigate fluid forces that oppose the biasing force of the spring 126 when the solenoid coil 138 is de-energized.

The distal end face 303 can comprise a metering edge 302 that is straight or planar in a lateral direction. As the spring 126 pushes the spool 104 in the proximal direction when the solenoid coil 138 is de-energized, the metering edge 302 can clear or move past the distal edges of the cross-holes 110A, 110B, thereby causing the flow area 148 to be form and fluid can flow from the second port 108 to the first port 106. The spool 104 further includes protrusion 304 that protrudes distally relative to a plane of the metering edge 302.

In an example, the protrusion 304 can have a tapered exterior surface 306, being tapered at a particular angle (e.g., an angle between 10 degrees and 40 degrees) relative to a longitudinal axis 308 of the spool 104. The tapered exterior surface 306 may facilitate guiding the fluid jet as fluid flows through the flow area 148 in a manner that reduces drag fluid forces acting on the spool 104 in the distal direction. In another example, however, the protrusion 304 can have a non-tapered exterior surface, e.g., a surface that is longitudinally parallel to the longitudinal axis 308 of the spool 104.

As shown in FIG. 3, the metering edge 302 or straight portion of the distal end face 303 of the spool 104 does not extend laterally all the way from the exterior peripheral surface 301 of the spool 104 to the protrusion 304. Rather, the distal end face 303 of the spool 104 includes an undercut 310 laterally interposed between the metering edged 302 and the protrusion 304. With this configuration, the distal end surface of the spool 104 plunges straight laterally to form the metering edge 302, then recedes longitudinally inward to form the undercut 310, and then protrudes longitudinally outward to form the protrusion 304.

In an example, as shown in FIGS. 3-4, the undercut 310 can be configured as an annular groove formed by the distal end surface of the spool 104. In an example, the undercut 310 can be configured as annular groove having a round or semi-circular cross-section. In other examples, however, the undercut 310 can be configured as an annular groove having different or non-circular cross-section, e.g., a square, rectangular, or trapezoidal cross-section or profile.

In another example, the undercut 310 might not be formed as a continuous annular groove about the distal end face 303 of the spool 104. Rather, the undercut 310 may be configured as separate segments (e.g., an array of segments disposed about the distal end surface of the spool 104) separated by non-receding portions.

The undercut 310 may reduce or mitigate the effects of the various fluid forces acting on the spool 104 against the biasing force of the spring 126 and affecting performance of the valve 100 when the solenoid coil 138 is de-energized. For example, the undercut 310 can cause the fluid jet entering the flow area 148 to separate from or be deflected distally away from the distal end surface of the spool 104, thereby changing a pressure profile of fluid interfacing with the distal end surface of the spool 104 compared to a spool configuration where the metering edge 302 extends laterally to the protrusion 304.

As the fluid jet of fluid flowing through the flow area 148 is deflected away or separated from the distal end surface rather than move along the distal end surface, the effect of fluid forces acting in the distal direction of the spool 104 may be mitigated. Further, as the fluid jet is distally deflected away from the distal end surface of the spool 104, the transitory stagnation pressure that might form at the distal end of the spool 104 may be reduced, or the location where the transitory stagnation pressure may move further distally, such that a high transitory stagnation pressure is not communicated back to the chamber 124. This way, the fluid forces acting on the spool 104 in the distal direction against the biasing force of the spring 126 may be reduced or mitigated. As such, the configuration of the spool 104 including the undercut 310 may enhance performance of the valve 100 relative to a valve that might not have such configuration or features.

Figure 5:
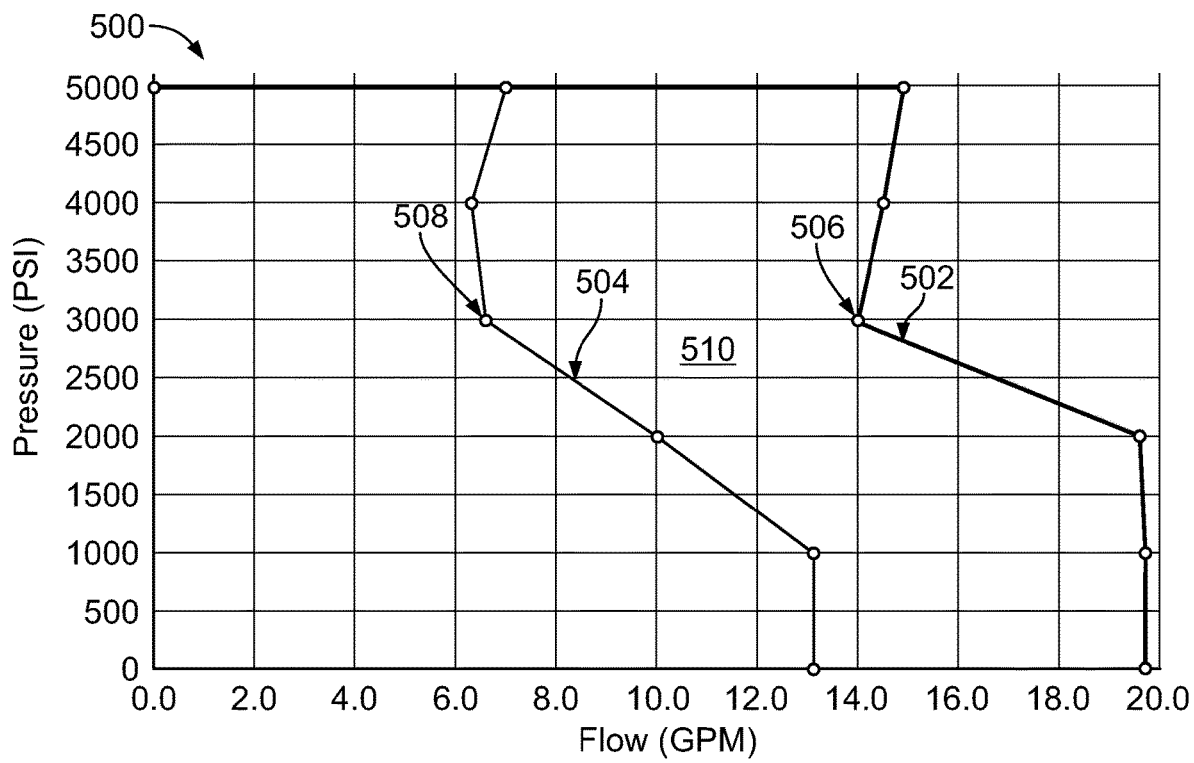
FIG. 5 illustrates a graph of experimental results showing performance enhancement associated with using the spool of FIG. 3, in accordance with an example implementation.

FIG. 5 illustrates a graph 500 of experimental results showing performance enhancement associated with using the spool 104, in accordance with an example implementation. Particularly, the graph 500 illustrates experimental results comparing performance of the valve 100 having the spool 104 to a valve having a spool without fluid force mitigation and jet deflection features of the spool 104 when the respective solenoid coil of the respective valve is de-energized and the valve is transitioning from an actuated state to an unactuated state.

Figure 6:
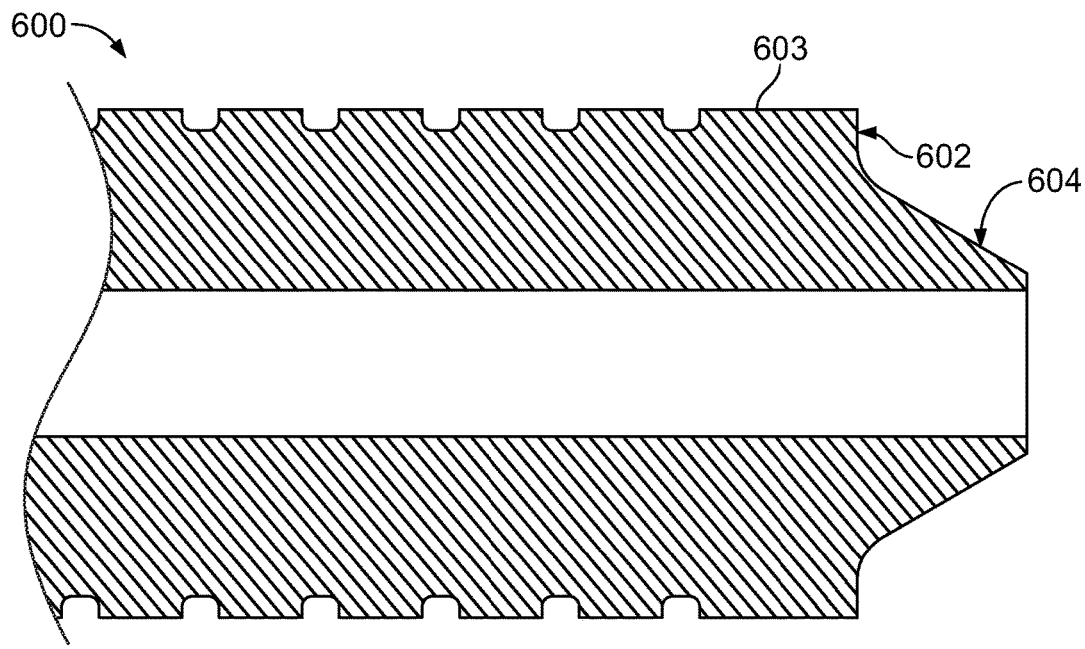
FIG. 6 illustrates a partial cross-sectional side view of a spool without fluid force mitigation features, in accordance with an example implementation.

FIG. 6 illustrates a partial cross-sectional side view of a spool 600 without fluid force mitigation features of the spool 104. For instance, the spool 600 can have a metering edge 602 that extends from an exterior peripheral surface 603 of the spool 600 to a protrusion 604 of the spool 600, without an undercut therebetween.

The x-axis of the graph 500 depicts fluid flow from the second port 108 to the first port 106 in gpm. The y-axis depicts pressure level of fluid at the second port 108 in psi. The pressure level at the first port 106 may be atmospheric pressure, e.g., about 0 psi, and therefore the pressure level on the y-axis can represent substantially the pressure drop or pressure differential between fluid at the second port 108 and fluid at the first port 106 as fluid flows therebetween.

Line 502 represents performance of the valve 100 with the spool 104 having the fluid force mitigation features (e.g., the jet deflection features) described above. Line 504 represents performance of a valve having the spool 600 without the fluid force mitigation features described above.

Particularly, the lines 502, 504 show the ability of their respective spools to shift from a position where they block the inlet port (e.g., the second port 108) at high pressure to a position where fluid is allowed to flow to the outlet port (e.g., the first port 106) when the solenoid coil 138 is de-energized. When the spool 104, 600 shifts and the flow area 148 is formed, the pressure level of fluid at the inlet port drops to a pressure level that is equal to the pressure level at the outlet port plus the pressure drop across the flow area 148 at a given flow rate. The points of the lines 502, 504 illustrates at what pressure level and flow rate the respective spools no longer reliably shift to an expected position because of the flow forces. As depicted in FIG. 5, the performance shown by the line 502 represents an enhancement compared to the line 504.

As an example, comparing point 506 of the line 502 to point 508 of the line 504, at a pressure level of 3000 psi, the point 506 indicates a flow rate of about 14 gpm, whereas the point 508 indicates a flow rate of 6.5 gpm, which is less than half of the 14 gpm flowing through the valve 100. All other points of the line 502 are similarly shifted along the x-axis relative to the line 504 indicating an increase in fluid flow rate through the valve 100 with the spool 104 at which the spool 104 does not shift to the fully-returned position compared to a valve with the spool 600 at a given pressure level. A region 510 of the graph 500 between the line 502 and the line 504 represents enhancement in the performance envelop of the valve 100 due to the features of the spool 104.

The experimental results shown in FIG. 5 indicate that the features of the spool 104 including the undercut 310 mitigate the fluid forces opposing the biasing force of the spring 126. As such, when the solenoid coil 138 of the valve 100 having the spool 104 is de-energized, the spring 126 is capable of returning the spool 104 substantially to its expected unactuated axial position.

Conversely, when a solenoid coil of a valve having the spool 600 is de-energized, the large fluid forces generated oppose the spring 126, which might not be capable of returning the spool 600 substantially to its expected unactuated axial position. Rather, the spool 600 might be held in a position between an actuated position and an unactuated position. In other words, the flow area 148 associated with the valve 100 and the spool 104 may be larger than a respective flow area of a valve with the spool 600 when the solenoid coils are de-energized.

Although the valve 100 is configured as a three-port valve, the fluid force mitigation features of the spool 104 can be used with any other valve where fluid is received laterally at a port disposed on a side of a housing of the valve and is discharged longitudinally through a port at a distal end or nose of the housing. Further, although the solenoid actuator described herein is a push-type solenoid actuator, the enhancement spool features disclosed herein are also applicable in a valve where the solenoid actuator is a pull-type solenoid actuator.

Figure 7:
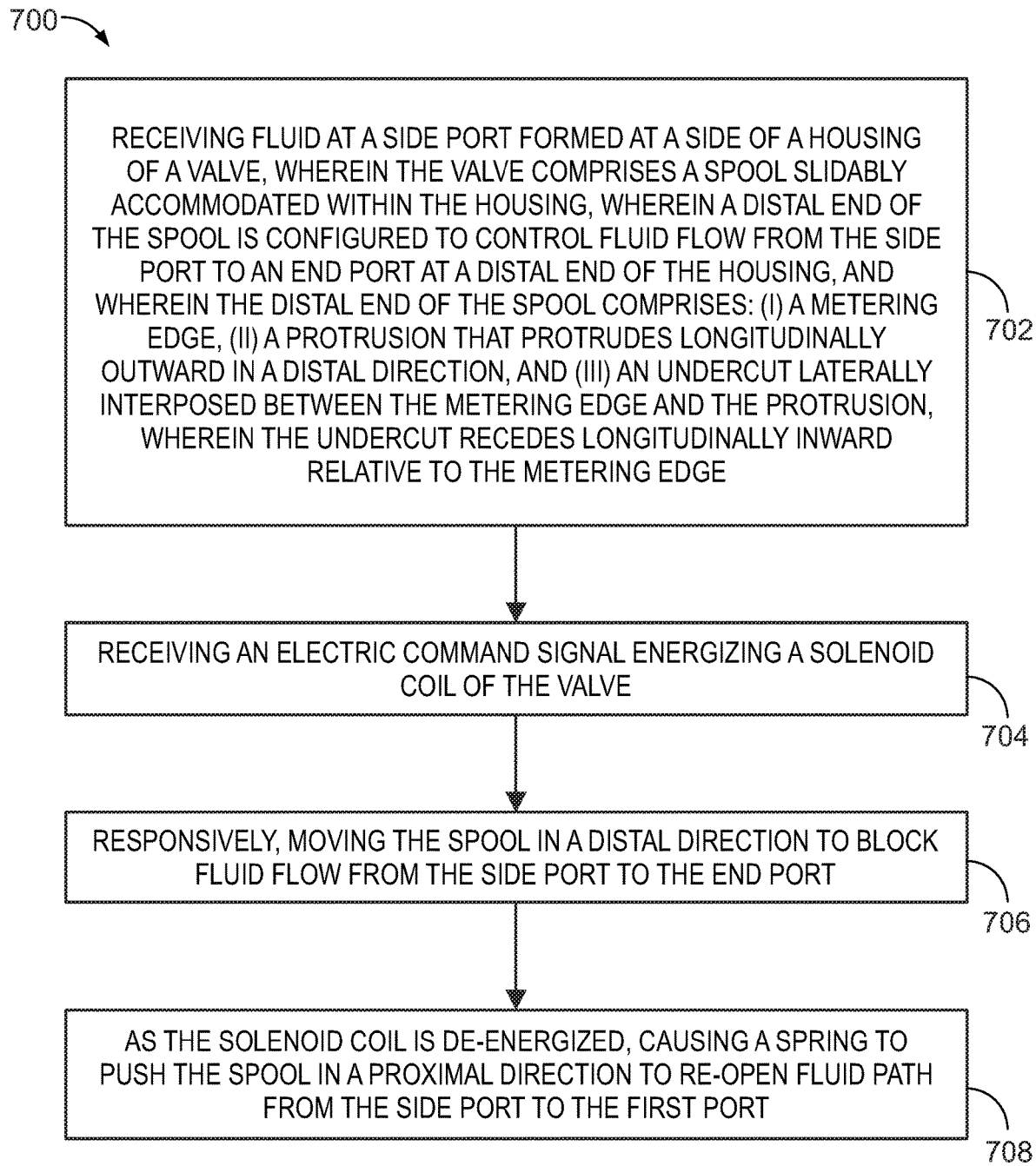
FIG. 7 a flowchart of a method for operating a valve, in accordance with an example implementation.

FIG. 7 is a flowchart of a method 700 for operating a valve, in accordance with an example implementation. The method 700 shown in FIG. 7 presents an example of a method that can be used with the valve 100 shown throughout the Figures, for example. The method 700 may include one or more operations, functions, or actions as illustrated by one or more of blocks 702-708. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 702, the method 700 includes receiving fluid at a side port formed at a side of a housing of a valve, wherein the valve comprises a spool slidably accommodated within the housing, wherein a distal end of the spool is configured to control fluid flow from the side port to an end port at a distal end of the housing, and wherein the distal end of the spool comprises: (i) a metering edge, (ii) a protrusion that protrudes longitudinally outward in a distal direction, and (iii) an undercut laterally interposed between the metering edge and the protrusion, wherein the undercut recedes longitudinally inward relative to the metering edge.

At block 704, the method 700 includes receiving an electric command signal energizing a solenoid coil of the valve.

At block 706, the method 700 includes, responsively, moving the spool in a distal direction to block fluid flow from the side port to the end port.

At block 708, the method 700 includes, as the solenoid coil is de-energized, causing a spring to push the spool in a proximal direction to re-open fluid path from the side port to the first port.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
    a housing having a first port at a distal end of the housing and a second port at a side of the housing, wherein the housing is configured to receive fluid flowing laterally to the second port at the side of the housing and discharge fluid longitudinally through the first port; and
    a spool slidably accommodated within the housing, wherein a distal end of the spool is configured to control fluid flow from the second port to the first port, and wherein a distal end face of the spool comprises: (i) a metering edge, (ii) a protrusion that protrudes longitudinally outward in a distal direction, (iii) an undercut laterally interposed between the metering edge and the protrusion, wherein the undercut recedes longitudinally inward relative to the metering edge, and (iv) a longitudinal fluid channel.

2. The valve of claim 1, wherein the undercut is configured as an annular groove formed in the distal end face of the spool.

3. The valve of claim 1, wherein the protrusion comprises a tapered exterior surface that is tapered at a particular angle relative to a longitudinal axis of the spool.

4. The valve of claim 1, further comprising:
    a solenoid actuator having a solenoid coil and an armature coupled to the spool, wherein as the solenoid coil is energized, a solenoid force is generated, causing the armature and the spool to move axially in the distal direction, thereby reducing or blocking fluid flow from the second port to the first port.

5. The valve of claim 4, further comprising:
    a spring disposed about an exterior surface of the spool in a chamber formed between the exterior surface of the spool and an interior surface of the housing, wherein the spring applies a biasing force on the spool in a proximal direction, such that the spool moves to a particular axial position based on a force equilibrium between the solenoid force and the biasing force, and wherein the spring is configured to return the spool in the proximal direction to an unactuated axial position when the solenoid coil is de-energized.

6. The valve of claim 5, wherein a distal end of the spring is secured against a shoulder formed by the interior surface of the housing, and wherein a proximal end of the spring rests against a ring disposed about the exterior surface of the spool, thereby causing the spring to apply the biasing force on the spool via the ring.

7. The valve of claim 1, wherein the first port is configured to be fluidly coupled to a fluid reservoir and the second port is configured to be fluidly coupled to a source of fluid, wherein the housing further comprises a third port configured to be fluidly coupled to a hydraulic consumer, wherein the second port comprises:
 a first set of cross-holes formed in the housing and configured to communicate fluid from the second port to the first port when the spool is in a first axial position; and
 a second set of cross-holes that are axially-spaced from the first set of cross-holes along a length of the housing and configured to communicate fluid from the second port to the third port when the spool is in a second axial position.

8. The valve of claim 7, wherein the spool comprises an annular groove formed by an exterior surface of the spool, wherein the spool is axially movable between (i) the first axial position at which fluid flows through the first set of cross-holes of the second port to the first port, and (ii) the second axial position at which the spool blocks the first set of cross-holes, and the annular groove fluidly couples the second set of cross-holes to the third port.

9. An assembly comprising:
 a valve comprising:
  a housing having a first port at a distal end of the housing and a second port at a side of the housing, wherein the housing comprises a first shoulder and threads formed on an exterior surface of the housing, and
  a spool slidably accommodated within the housing, wherein a distal end of the spool is configured to control fluid flow from the second port to the first port, and wherein a distal end face of the spool comprises: (i) a metering edge, (ii) a protrusion that protrudes longitudinally outward in a distal direction, (iii) an undercut laterally interposed between the metering edge and the protrusion, wherein the undercut recedes longitudinally inward relative to the metering edge, and (iv) a longitudinal fluid channel; and
 a manifold having a cavity in which the valve is disposed, wherein the manifold comprises: (i) a first manifold port fluidly coupled to the first port of the valve via a first fluid passage, wherein the first manifold port is configured to be fluidly coupled to a fluid reservoir, (ii) a second manifold port fluidly coupled to the second port of the valve via a second fluid passage, wherein the second manifold port is configured to be fluidly coupled to a source of fluid, and (iii) a second shoulder formed by an interior surface of the manifold, and (iv) respective threads formed on the interior surface of the manifold, wherein the threads of the valve threadedly engage the respective threads of the manifold, wherein the first shoulder of the housing mates with the second shoulder of the manifold, and wherein the assembly is configured such that fluid is received at the second manifold port and is provided laterally to the second port of the valve via the second fluid passage, and fluid is discharged longitudinally through the first port of the housing through the first fluid passage and the first manifold port.

10. The assembly of claim 9, wherein the undercut is configured as an annular groove formed in the distal end face of the spool.

11. The assembly of claim 9, wherein the protrusion comprises a tapered exterior surface that is tapered at a particular angle relative to a longitudinal axis of the spool.

12. The assembly of claim 9, wherein the valve further comprises:
 a solenoid actuator having a solenoid coil and an armature coupled to the spool, wherein as the solenoid coil is energized, a solenoid force is generated, causing the armature and the spool to move axially in the distal direction, thereby reducing or blocking fluid flow from the second port to the first port.

13. The assembly of claim 12, wherein the valve further comprises:
 a spring disposed about an exterior surface of the spool in a chamber formed between the exterior surface of the spool and an interior surface of the housing, wherein the spring applies a biasing force on the spool in a proximal direction, such that the spool moves to a particular axial position based on a force equilibrium between the solenoid force and the biasing force, and wherein the spring is configured to return the spool in the proximal direction to an unactuated axial position when the solenoid coil is de-energized.

14. The assembly of claim 13, wherein a distal end of the spring is secured against a shoulder formed by the interior surface of the housing, and wherein a proximal end of the spring rests against a ring disposed about the exterior surface of the spool, thereby causing the spring to apply the biasing force on the spool via the ring.

15. The assembly of claim 9, wherein the manifold further comprises a third manifold port configured to be fluidly coupled to a hydraulic consumer, wherein the housing further comprises a third port configured to be fluidly coupled to the third manifold port via a third fluid passage, wherein the second port of the valve comprises:
 a first set of cross-holes formed in the housing and configured to communicate fluid from the second port to the first port when the spool is in a first axial position; and
 a second set of cross-holes that are axially-spaced from the first set of cross-holes along a length of the housing and configured to communicate fluid from the second port to the third port when the spool is in a second axial position.

16. The assembly of claim 15, wherein the spool comprises an annular groove formed by an exterior surface of the spool, wherein the spool is axially movable between (i) the first axial position at which fluid flows through the first set of cross-holes of the second port to the first port, and (ii) the second axial position at which the spool blocks the first set of cross-holes, and the annular groove fluidly couples the second set of cross-holes to the third port.

17. A hydraulic system comprising:
 a source of fluid;
 a fluid reservoir; and
 a valve comprising:
  a housing having (i) a first port at a distal end of the housing and fluidly coupled to the fluid reservoir, and (ii) a second port at a side of the housing and fluidly coupled to the source of fluid, such that fluid flows laterally from the source of fluid to the second port at the side of the housing and fluid is discharged longitudinally through the first port at the distal end of the housing, and a spool slidably accommodated within the housing, wherein a distal end of the spool is configured to control fluid flow from the second port to the first port, and wherein a distal end face of the spool comprises: (i) a metering edge, (ii) a protrusion that protrudes longitudinally outward in a distal direction, (iii) an undercut laterally interposed between the metering edge and the protrusion, wherein the undercut recedes longitudinally inward relative to the metering edge, and (iv) a longitudinal fluid channel.

18. The hydraulic system of claim 17, wherein the undercut is configured as an annular groove formed in the distal end face of the spool.

19. The hydraulic system of claim 17, wherein the protrusion comprises a tapered exterior surface that is tapered at a particular angle relative to a longitudinal axis of the spool.

20. The hydraulic system of claim 17, wherein the valve further comprises:

a solenoid actuator having a solenoid coil and an armature coupled to the spool, wherein as the solenoid coil is energized, a solenoid force is generated, causing the armature and the spool to move axially in the distal direction, thereby reducing or blocking fluid flow from the second port to the first port; and a spring disposed about an exterior surface of the spool in a chamber formed between the exterior surface of the spool and an interior surface of the housing, wherein the spring applies a biasing force on the spool in a proximal direction, such that the spool moves to a particular axial position based on a force equilibrium between the solenoid force and the biasing force, and wherein the spring is configured to return the spool in the proximal direction to an unactuated axial position when the solenoid coil is de-energized.

* * * * *